L. MESSER.
Fastening for Pocket-Book.
No. 163,794. Patented May 25, 1875.
Fig. 1.
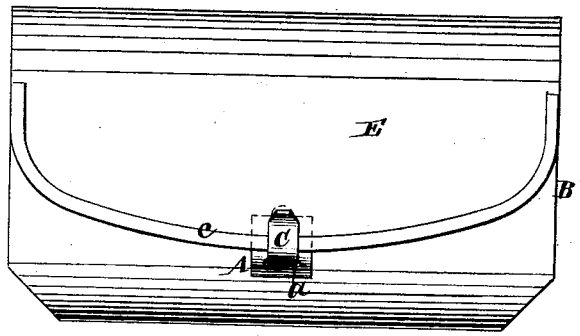
Fig. 2. Fig. 3.
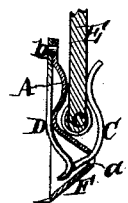 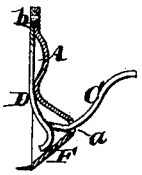
Fig. 4.
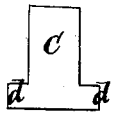
Witnesses.
Otto Hufeland.
Ernst Bilhuber.
Inventor.
Louis Messer
Van Santvoord & Hauff
Attys
THE GRAPHIC CO. PHOTO-LITH. 39 & 41 PARK PLACE, N.Y.

UNITED STATES PATENT OFFICE.

LOUIS MESSER, OF NEW YORK, N. Y.

IMPROVEMENT IN FASTENINGS FOR POCKET-BOOKS.

Specification forming part of Letters Patent No. 163,794, dated May 25, 1875; application filed April 29, 1875.

*To all whom it may concern:*

Be it known that I, LOUIS MESSER, of the city, county, and State of New York, have invented a certain new and Improved Fastening for Pocket-Books and other similar articles, of which the following is a specification:

This invention is illustrated in the accompanying drawing, in which—

Figure 1 represents it applied to a pocket-book. Fig. 2 is a cross-section, showing my fastening detached and in a closed condition. Fig. 3 is a like section, showing it in an open condition. Fig. 4 shows the hook detached.

Similar letters indicate corresponding parts.

My invention relates to an improved form of fastening for pocket-books and other similar articles; and consists in a finger-hook which is connected to a suitable case, and when the latter is secured to the side of a pocket-book is adapted to interlock with an abutment secured to the flap, the hook being subjected to the action of a spring attached to the case, in such a manner that the hook is retained in either an open or a closed condition.

In the drawing, the letter A designates the case of my fastening, which, in Fig. 1, is secured to the side of a pocket-book, B, in any suitable manner. The case is provided with a slit, $a$, through and around which is bent the end of a hook, C. The hook is made of flat metal, and is provided with lateral projections $d$, as shown in Fig. 4, which catch under the case A at the ends of the slit $a$, and by this means a connection of the hook is formed with the case. Within the case is located a spring, D, which is riveted thereto at $b$, and which presses upon the end of the hook C. The spring D is so arranged relatively to the hook C that by the action of the spring the hook is firmly held in two of its positions, one position being parallel with the case A, as shown in Fig. 2, and the other position being at an angle to the case, as shown in Fig. 3. The pocket-book is provided with the ordinary flap E, to which is secured an abutment, $c$. The abutment is composed, in the present example, of the metallic rim-piece of the flap; but it may have any other form.

If, when the hook is adjusted to the position shown in Fig. 2, the flap E or its abutment $c$ is placed thereunder, the hook interlocks with the abutment, and by this means the flap is firmly held shut. When the hook C is raised and turned from the position shown in Fig. 1 to that of Fig. 2, the flap E is released.

The portion of the case A that receives the end of the hook C has the form of a ridge, F, which constitutes a stop to the flap E, and admits of bringing the hook above the abutment $c$.

By this means I obtain a cheap fastening, and one which is exceedingly simple in construction.

The abutment or rim-piece $c$ is made of a strip of sheet metal, which is bent on the edge of the leather or other material of the flap E in such a manner as to bite into the leather and obtain a firm hold of said edge.

By this means I am enabled to dispense with fastening devices and to save a great amount of labor.

What I claim as new, and desire to secure by Letters Patent, is—

In a fastening for pocket-books and other similar articles, the combination of the hook C, case A, the spring D, and the abutment $c$, all constructed and adapted to operate substantially as described.

In testimony that I claim the foregoing I have hereunto set my hand and seal this 22d day of April, 1875.

LOUIS MESSER. [L. S.]

Witnesses:
 W. HAUFF,
 E. F. KASTENHUBER.